(12) United States Patent
Hatfield et al.

(10) Patent No.: US 7,994,920 B2
(45) Date of Patent: Aug. 9, 2011

(54) RFID SECURITY IN AN RFID-ENABLED MEDIUM

(75) Inventors: Nathaniel K. Hatfield, Cary, NC (US); Daniel P. Kelaher, Holly Springs, NC (US); Thomas J. Sluchak, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 12/270,886

(22) Filed: Nov. 14, 2008

(65) Prior Publication Data

US 2010/0123581 A1    May 20, 2010

(51) Int. Cl.
  *G08B 23/00*    (2006.01)
(52) U.S. Cl. ............... 340/572.3; 340/572.1; 340/572.8; 340/5.6
(58) Field of Classification Search ............... 340/572.3, 340/686.1, 687, 5.6, 572.2, 572.4, 572.8, 340/572.1, 572.7; 713/186; 235/492
  See application file for complete search history.

(56) References Cited

U.S. PATENT DOCUMENTS

| | | | |
|---|---|---|---|
| 5,623,552 A * | 4/1997 | Lane | 382/124 |
| 6,424,029 B1 * | 7/2002 | Giesler | 257/679 |
| 7,064,653 B2 | 6/2006 | Dalglish | |
| 7,100,835 B2 * | 9/2006 | Selker | 235/492 |
| 7,151,455 B2 | 12/2006 | Lindsay et al. | |
| 7,336,184 B2 | 2/2008 | Smith et al. | |
| 7,543,156 B2 * | 6/2009 | Campisi | 713/186 |
| 7,735,733 B2 * | 6/2010 | Kranzley | 235/439 |
| 2003/0058110 A1 | 3/2003 | Rich | |
| 2006/0139180 A1 | 6/2006 | Smith et al. | |
| 2007/0075140 A1 | 4/2007 | Guez et al. | |
| 2007/0152829 A1 | 7/2007 | Lindsay et al. | |
| 2007/0252944 A1 | 11/2007 | Welchel et al. | |
| 2010/0081374 A1 * | 4/2010 | Moosavi | 455/41.1 |

FOREIGN PATENT DOCUMENTS

WO   WO 2007/066981 A1   6/2007

OTHER PUBLICATIONS http://www.schneier.com/blog/archives/2006/12/rfid_personal_f.html.

* cited by examiner

*Primary Examiner* — Toan N Pham
(74) *Attorney, Agent, or Firm* — Brandon C. Kennedy; Cynthia G. Seal; Biggers & Ohanian, LLP.

(57) ABSTRACT

Methods and apparatus for Radio Frequency Identification (RFID) security in an RFID-enabled medium, the RFID-enabled medium including an RFID tag coupled to an antenna, and a touch sensing switch, the touch sensing switch coupled to an electrode and a power source, the touch sensing switch adapting the RFID tag to the power source, the RFID security including: sensing, by the touch sensing switch, human contact with the electrode; and providing, by the touch sensing switch only during human contact with the electrode, operating power from the power source to the RFID tag.

18 Claims, 6 Drawing Sheets

RFID SECURITY IN AN RFID-ENABLED MEDIUM

BACKGROUND OF THE INVENTION

1. Field of the Invention

The field of the invention is data processing, or, more specifically, methods and apparatus for Radio Frequency Identification (RFID) security in an RFID-enabled medium.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of technology in which advances have been made is Radio Frequency Identification ('RFID'). RFID tags are increasingly more common in credit cards, debit cards, medical record cards, driver's licenses, government issued identification cards, passports, and so on. Such RFID tags generally store user's private information or keys to accessing such information. Current RFID technology however, being 'always-on,' is prone to data theft, maliciously tracking an individual through RFID tags, and so on. Current technology to deactivate an RFID tag is typically a mechanical switch, prone to accidental operation, physically cumbersome in smaller applications, costly, and prone to failure due to physical wear.

SUMMARY OF THE INVENTION

Methods and apparatus for Radio Frequency Identification ('RFID') security in an RFID-enabled medium are disclosed in this specification, the RFID-enabled medium including an RFID tag coupled to an antenna, and a touch sensing switch, the touch sensing switch coupled to an electrode and a power source, the touch sensing switch adapting the RFID tag to the power source, the RFID security including: sensing, by the touch sensing switch, human contact with the electrode; and providing, by the touch sensing switch only during human contact with the electrode, operating power from the power source to the RFID tag.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
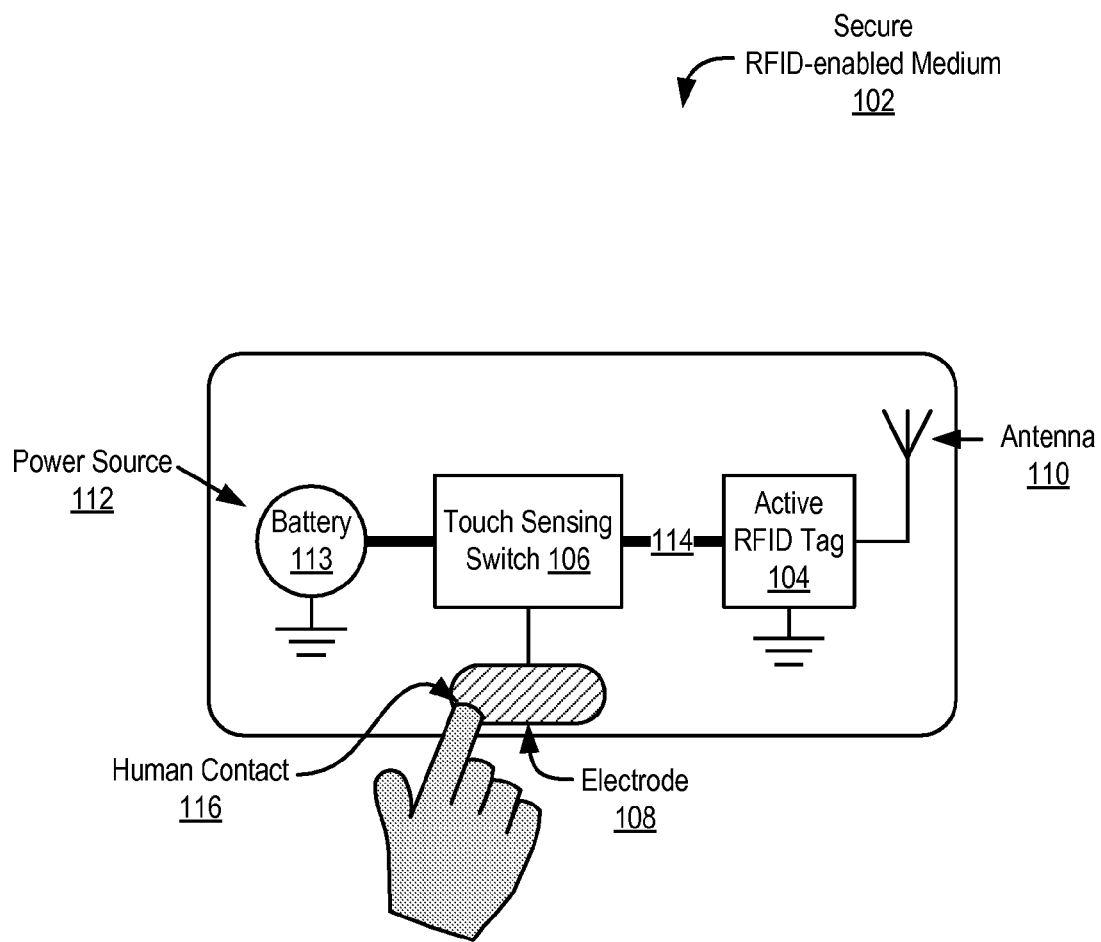
FIG. 1 sets forth a line drawing of an exemplary system for RFID security in an RFID-enabled medium according to embodiments of the present invention.

Exemplary methods, apparatus, and products for Radio Frequency Identification ('RFID') security in an RFID-enabled medium in accordance with the present invention are described with reference to the accompanying drawings, beginning with FIG. 1. FIG. 1 sets forth a line drawing of an exemplary system for RFID security in an RFID-enabled medium according to embodiments of the present invention. RFID is an automatic identification method in which data stored in computer memory, such as Electrically Erasable Programmable Read Only Memory ('EEPROM'), of an RFID tag, is retrieved remotely through Radio Frequency ('RF') signals. The system of FIG. 1 includes a secure, RFID-enabled medium (102). An RFID-enabled medium is any medium that includes an RFID tag and an antenna. Examples of such RFID-enabled media which may be configured for security according to embodiments of the present invention include government issued identification cards, government issued drivers licenses, passports, financial institution issued automated teller machine ('ATM') cards, credit cards, debit cards, and so on as will occur to readers of skill in the art.

The RFID-enabled medium (102) in the example of FIG. 1 includes an RFID tag (104) coupled to an antenna (110) and a touch sensing switch (106). An RFID tag (104) is a component connected to an antenna where the component is configured to respond through the antenna, upon receiving a query encoded in an RF signal from an RFID transceiver through the antenna, with data stored in computer memory of the RFID tag (104). RFID tags may include an integrated circuit that in turn includes such computer memory, as well as circuitry, for modulating and demodulating RF signals. The example RFID tag (104) in FIG. 1 is an active RFID tag. An active RFID tag is an RFID tag that requires a dedicated power source (112) to operate. In the example of FIG. 1 the battery (113) in the RFID-enabled medium (102) operates as the dedicated power source (112) for the active RFID tag (104).

The example touch sensing switch (106) of the RFID-enabled medium of FIG. 1 is coupled to an electrode (108) and a power source (112), in this example a battery (113). An electrode (108) is an electrical conductor used to receive contact other than metallic contact, in this case human contact. The example touch sensing switch (106) is configured to sense human contact (116) with the electrode (108). A touch sensing switch (106) is a switch operated upon human touch. One type of touch sensing switch is a capacitance touch switch in which the body capacitance of a human, when applied to the electrode, alters a sensed capacitance greater than a predefined threshold amount, activating the touch sensing switch. Some capacitance touch sensing switches continually charge and discharge the electrode, generating a projected proximity field around the electrode, while monitoring changes in the capacitance of the electrode. Examples of capacitance touch sensing switches that may be modified for use in a secure, RFID-enabled medium (102) according to embodiments of the present invention include the Charge- Transfer Touch Sensor QProx™ QT113 and QT113H manufactured by Quantum Research Group, Ltd. Some touch sensing switches, such as the QT113 and QT113H, are configured to assert a signal on an output pin of the touch sensing switch (106) Integrated Circuit ('IC') upon detecting human contact (116) on the electrode (108). Other touch sensing switches (106) may include a Field Effect Transistor ('FET')-switching circuit that electrically connects the power supply (112) to the active RFID tag (104) when there is human contact (116) with the electrode (108).

Human contact, as the term is used here, refers to both direct and somewhat indirect contact. Due to the previously mentioned projected proximity field, the electrode may be 'touched' and the touch sensing switch may detect such a touch prior to actual, direct human contact with the electrode, when human contact 'breaks' the proximity field. In typical embodiments, human contact will only break the field, however, upon near direct contact. As such, a user must typically be holding the RFID-enabled medium (102) of FIG. 1 by hand to have human contact (116) with the electrode (108) and activate the touch sensing switch (106). Because human contact (116) may occur without direct human contact, however, the electrode may be implemented beneath an outer layer of an RFID-enabled medium. Consider, for example a RFID-enabled medium (102) implemented a government issued identification card. The electrode may be imbedded in the card, behind the outer layers of plastic.

The example touch sensing switch (106) of the RFID-enabled medium (102) adapts the RFID tag (104) to the power source (112). The touch sensing switch (106) is said to adapt the RFID tag (104) to the power source (112), the battery (113), in that the touch sensing switch (106) provides operating power, through wire line (114), from the power source (112) to the RFID tag (104) only during human contact (116) with the electrode (108). That is, the active RFID tag (104) is only operational when human contact (116) is applied to the electrode (108). Upon releasing human contact from the electrode (108) the touch sensing switch (106) ceases providing operating power to the active RFID tag (104), and the active RFID tag (104) is not-operational. The example touch sensing switch (106) may provide operating power from the power source (112) to the RFID tag (104) only during human contact (116) with the electrode (108) in several ways including, for example, by connecting an electrical pathway from the battery directly to the active RFID tag (104) through the switch, by asserting a signal on an output of the switch only when there is human contact on the electrode, where the output is connected to the power supply input of the active RFID tag (104), and in other ways as may occur to readers of skill in the art.

In some embodiments of the present invention, the touch sensing switch (106) is coupled to two electrodes (108) and the RFID tag provides operating power from the power source to the RFID tag only during human contact with both electrodes. In such an example RFID-enabled medium, the two electrodes, upon human contact, may form a parallel network of capacitors, summing the separate body-capacitances applied on the electrodes. The touch sensing switch (106) of such an RFID-enabled medium may then be configured to activate only upon a sensed capacitance greater than a single body-capacitance applied on the electrode—requiring two, separate body-capacitances to be applied to the electrodes. That is, if only one electrode experiences human contact, the RFID tag is not provided power through the touch sensing switch. Example RFID-enabled media such as identification cards or financial institution cards according to embodiments having two electrodes may be configured with one electrode on both faces of the card. In this way, the risk of accidental-activation caused by unintentional, near human contact through pockets, through purses, and so on is reduced as most unintentional, near human contact typically occurs with regard to only one side of the card, that is, with only one electrode. Detecting a change in capacitance on an electrode is just one example way a touch sensing switch (106) configured according to embodiments of the present invention may identify human contact upon electrodes. Readers of skill in the art will immediately recognize other ways of identifying human contact upon electrodes including, for example, identifying a voltage differential caused upon human contact on two electrodes that exceeds a predetermined threshold. An RFID-enabled medium configured with such a touch sensing switch may be configured a comparator and two batteries for an active RFID-tag or two separate antenna-like configurations that transmit power upon inductance by an RFID transmitter.

Figure 2:
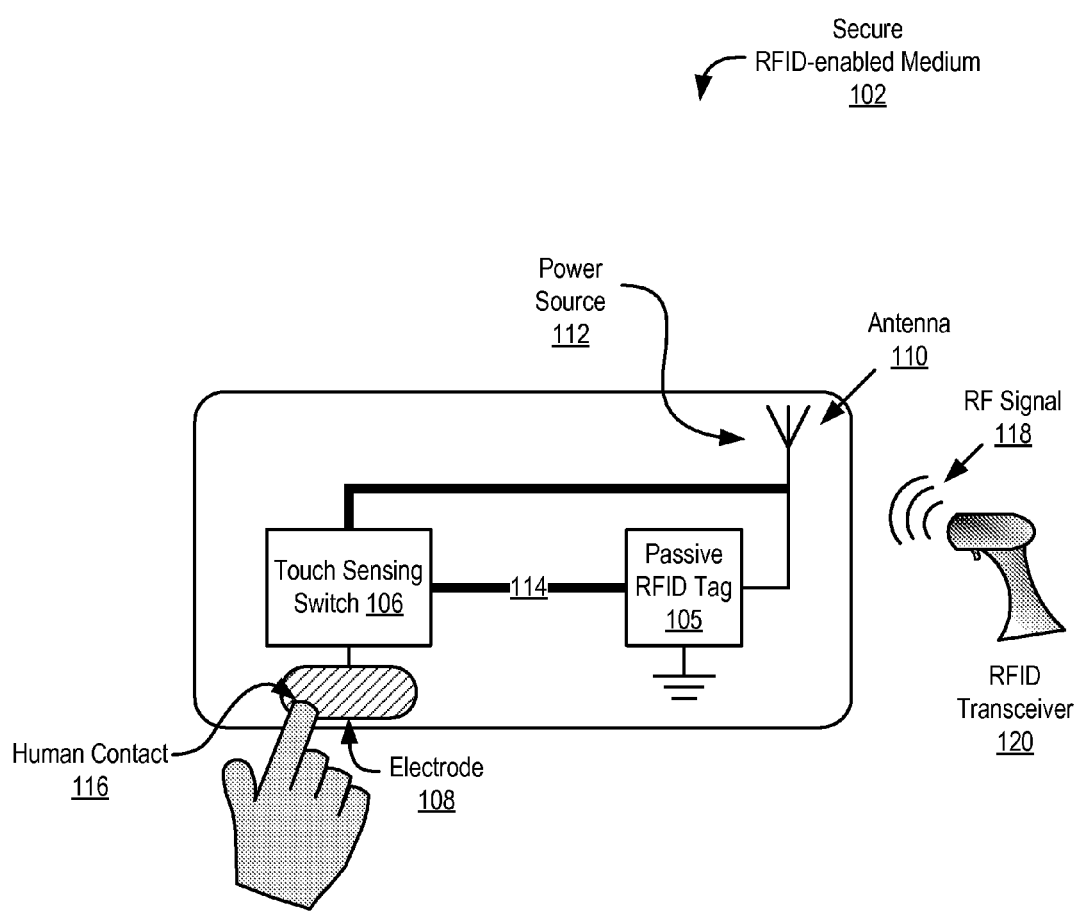
FIG. 2 sets forth a line drawing of a further exemplary system for RFID security in an RFID-enabled medium according to embodiments of the present invention.

For further explanation, FIG. 2 sets forth a line drawing of a further exemplary system for RFID security in an RFID-enabled medium according to embodiments of the present invention. The system of FIG. 2 is similar to the system of FIG. 1 including as it does, a secure RFID-enabled medium (102), which like the secure RFID-enabled medium of FIG. 1, also includes an RFID tag (105) coupled to an antenna (110) and a touch sensing switch (106). The RFID tag (105) in the example of FIG. 2 differs from the RFID tag (104) of FIG. 1 in that the RFID tag (105) of FIG. 2 is a passive RFID tag (105). A passive RFID tag (105) is an RFID tag that has no internal or external dedicated power supply, but instead uses electrical current induced in the antenna by an incoming RF signal from an RFID transceiver as supply power. In the example of FIG. 2, the current induced in the antenna (110) by an RFID transceiver (120) is only provided to the passive RFID tag (105) through the touch sensing switch (106). An RFID transceiver (120) is an aggregation of hardware and software capable of transmitting a query encoded in an RF signal (118) to an RFID tag (105) and receiving from the tag (105) a response to the query. RFID transceivers may be connected for data communications through a data communications network to one or more computers, servers, or data bases that process the response from the RFID tag (105).

The example touch sensing switch (106) of the secure, RFID-enabled medium of FIG. 2 is coupled to an electrode (108) and the power source (112). In the system of FIG. 2, the power source (112) is the antenna (110) when electrical current is induced in the antenna (110) upon receiving a transmitted RF signal (118) from the RFID transceiver (120). The touch sensing switch (106) in the example of FIG. 2, like the passive RFID tag (105), may also be powered by the current induced in the antenna (110) upon receiving a transmitted RF signal (118). The normal, or default, operation of the touch sensing switch (106), even without power, is to disconnect the passive RFID tag (105) from operating power.

The touch sensing switch (106) of FIG. 2, like the touch sensing switch of FIG. 1, is configured to sense human contact (116) with the electrode (108) and provide operating power, through wire line (114) in this example, from the power source (112), the antenna (110), to the RFID tag (105). In the example of FIG. 2, operating power is effectively redirected from direct input into the passive RFID tag (105) to an electrical path through the touch sensing switch. The passive RFID tag (105), therefore, is only operational when the touch sensing switch (106) provides the tag operational power through the wire line (114), and the touch sensing only provides power when there is human contact (116) on the electrode (108).

Figure 3A:
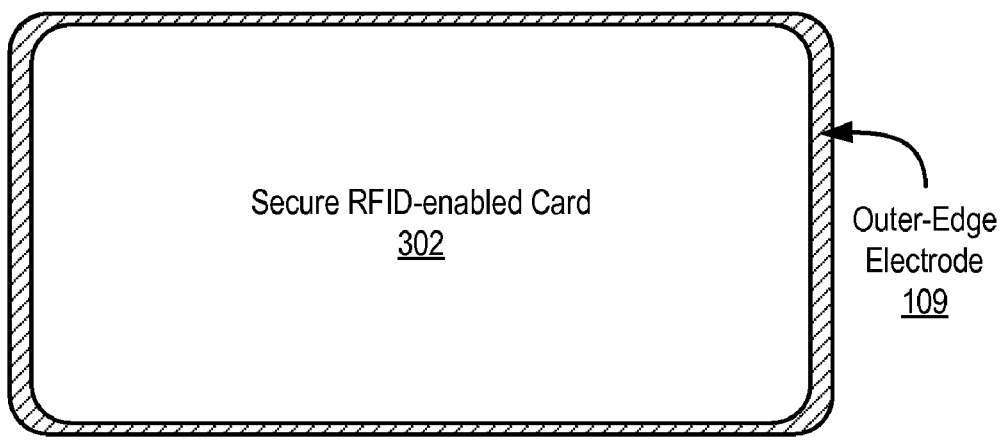
FIG. 3A sets forth a line drawing depicting an exemplary RFID-enabled card configured for security according to embodiments of the present invention.
Figure 3B:
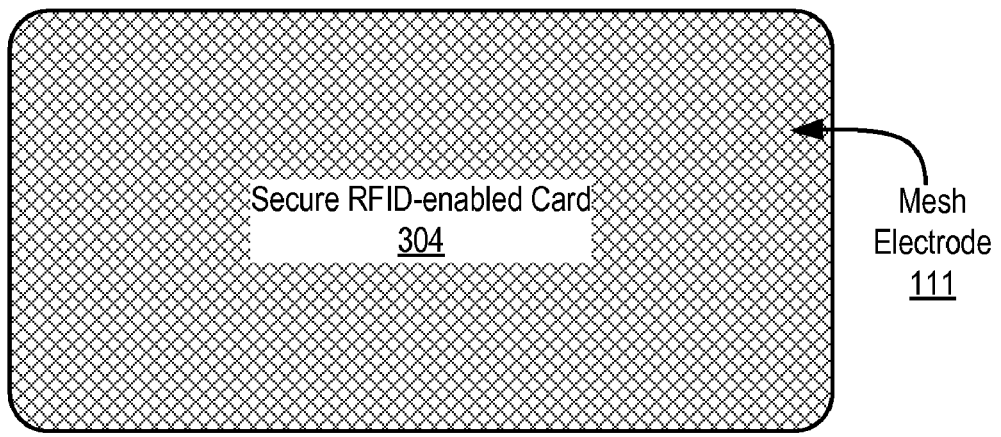
FIG. 3B sets forth a line drawing depicting a further exemplary RFID-enabled card configured for security according to embodiments of the present invention.

As mentioned above, the secure, RFID-enabled media (102) depicted in the example systems of FIG. 1 and FIG. 2 may be implemented in the form of a card, a government issued drivers license, a government issued identification card, a credit card, a debit card, an ATM card, and so on. For further explanation therefore, FIG. 3A sets forth a line drawing depicting an exemplary RFID-enabled card configured for security according to embodiments of the present invention and FIG. 3B sets forth a line drawing depicting a further exemplary RFID-enabled card configured for security according to embodiments of the present invention. The example RFID-enabled cards (302, 304) of FIGS. 3A and 3B depict alternative implementations of electrode configurations on the cards. In the example of FIG. 3A, the secure, RFID-enabled card (302) is configured with an outer-edge electrode (109) that may be installed on one or both faces of the card or imbedded within the card on the edge of the card (302). In the example of FIG. 3B, the secure, RFID-enabled card (304) is configured with a mesh electrode (111) that may be installed on either face of the card, or embedded within the card, such that human contact with electrode occurs each time the card is held anywhere by a human.

Figure 4:
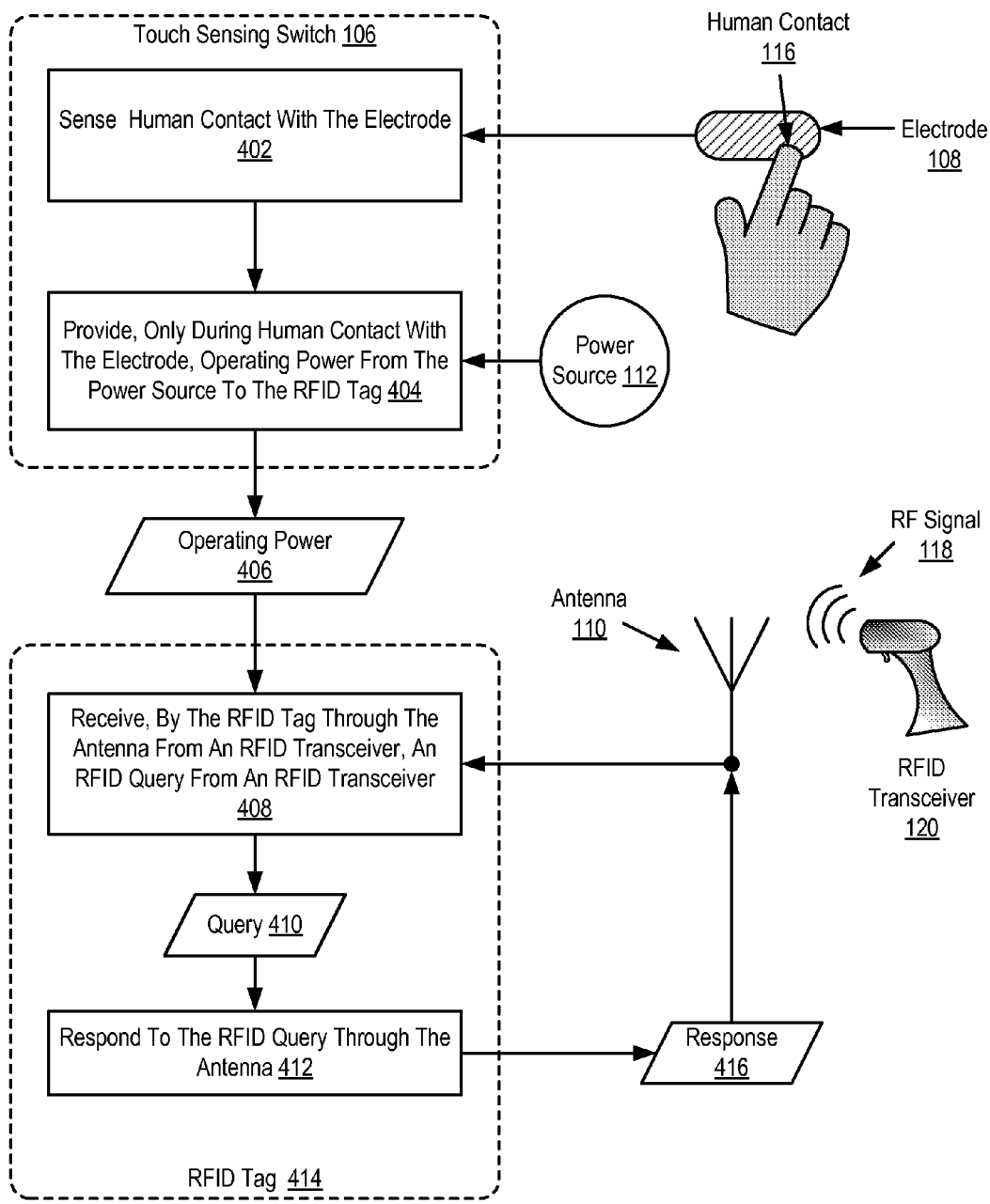
FIG. 4 sets forth a flow chart illustrating an exemplary method for RFID security in an RFID-enabled medium.

For further explanation, FIG. 4 sets forth a flow chart illustrating an exemplary method for RFID security in an RFID-enabled medium. The method of FIG. 4 is carried out in an RFID-enabled medium similar to the RFID-media depicted in previous figures, each of which includes an RFID tag (414) coupled to an antenna (110), and a touch sensing switch (106) coupled to an electrode (108) and a power source (112) where the touch sensing switch (106) adapts the RFID tag (414) to the power source (112).

The method of FIG. 4 includes sensing (402), by the touch sensing switch (106), human contact (116) with the electrode (108). The method of FIG. 4 also includes providing (404), by the touch sensing switch (106) only during human contact (116) with the electrode (108), operating power (406) from the power source (112) to the RFID tag (414). Providing (404) operating power (406) from the power source (112) to the RFID tag (414) only during human contact (116) with the electrode (108) may be carried out in various ways including for example, directly connecting the RFID tag to the power source through a FET-switch circuit, by asserting a signal on an output pin of the touch sensing switch with the output pin connected to the power supply input of the RFID tag, and so on as will occur to readers of skill in the art.

The method of FIG. 4 also includes receiving (408), by the RFID tag (414) through the antenna (110) from an RFID transceiver (120), an RFID query (410). Receiving (408) an RFID query (410) by the RFID tag (414) through the antenna (110) from an RFID transceiver (120) may be carried out by receiving the query encoded in an RF signal (118) transmission.

The method of FIG. 4 also includes responding (412) to the RFID query (410) by the RFID tag (414) through the antenna (110). Responding (412) to the RFID query (410) by the RFID tag (414) through the antenna (110) may be carried out by encoding in a RF signal the response (416). A response (416) to an RFID query (410) may include an identifier that uniquely or semi-uniquely identifies the RFID tag. Such an RFID identifier may be used as index into one or more tables and records of a database of information. Such information may include a social security number, name, mailing address, birthday, and so on of a carrier of a government issued RFID-enabled identification card, the social security number and recently visited countries of an RFID-enabled passport holder, medical records of a carrier of a health insurance card, and so on as will occur to readers of skill in the art.

Figure 5:
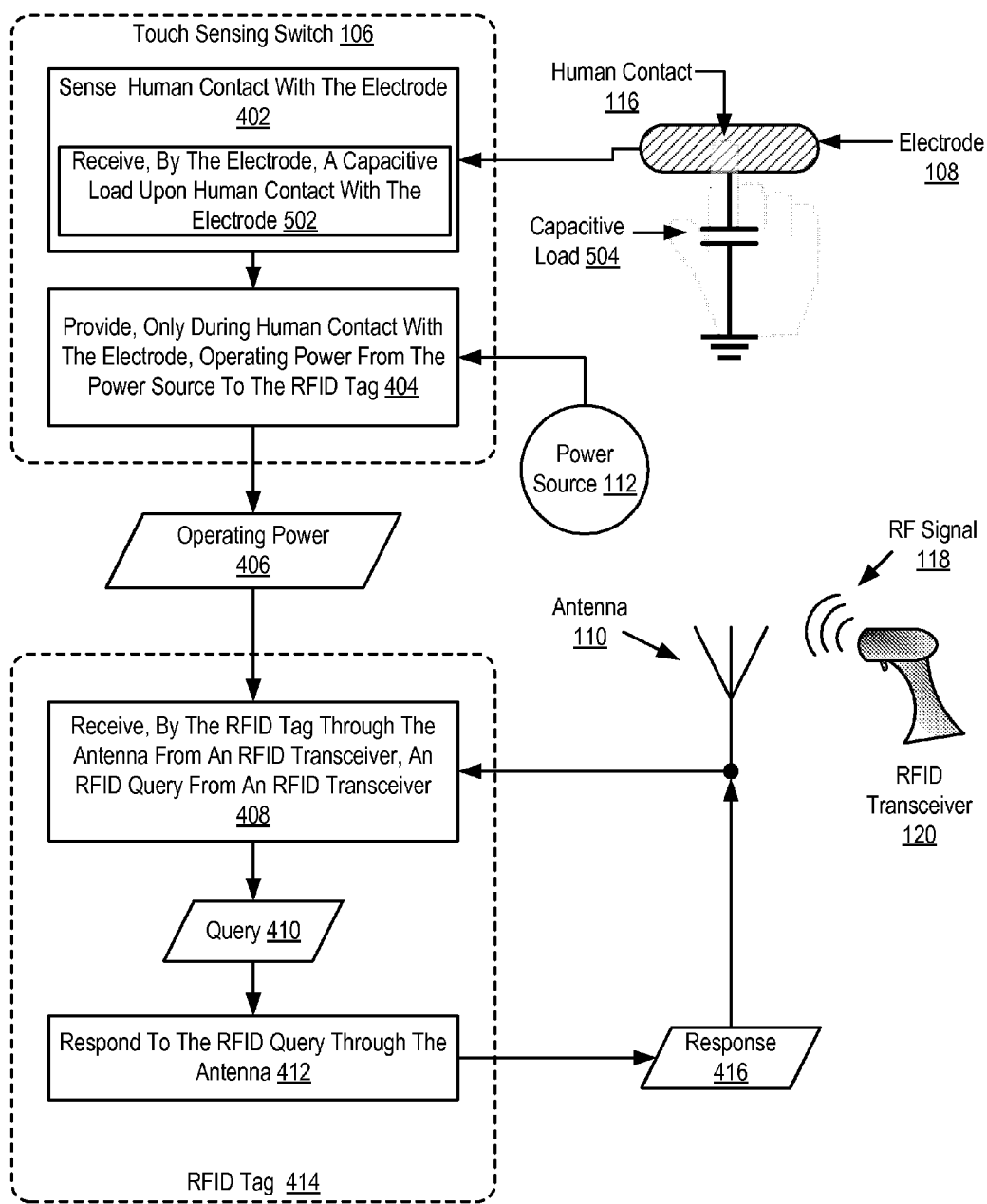
FIG. 5 sets forth a flow chart illustrating a further exemplary method for RFID security in an RFID-enabled medium according to embodiments of the present invention.

For further explanation, FIG. 5 sets forth a flow chart illustrating a further exemplary method for RFID security in an RFID-enabled medium according to embodiments of the present invention. The method of FIG. 5, like the method of FIG. 4, may be carried out in an RFID-enabled medium similar to the RFID-media depicted in previous figures, each of which includes an RFID tag (414) coupled to an antenna (110), and a touch sensing switch (106) coupled to an electrode (108) and a power source (112) where the touch sensing switch (106) adapts the RFID tag (414) to the power source (112). The method of FIG. 5 is similar to the method of FIG. 4, including as it does, sensing (402), by the touch sensing switch (106), human contact (116) with the electrode (108); providing (404), by the touch sensing switch (106) only during human contact (116) with the electrode (108), operating power (406) from the power source (112) to the RFID tag (414); receiving (408), by the RFID tag (414) through the antenna (110) from an RFID transceiver (120), an RFID query (410); and responding (412) to the RFID query (410) by the RFID tag (414) through the antenna (110). The method of FIG. 5 differs from the method of FIG. 4, however, in that in the method of FIG. 5 sensing (402), by the touch sensing switch (106), human contact (116) with the electrode (108) includes receiving (502), by the electrode (108), a capacitive load (504) upon human contact (116) with the electrode (108). Receiving (502), by the electrode (108), a capacitive load (504) upon human contact (116) with the electrode (108) may include breaking a proximity field projected by charging and discharging the electrode with a human body capacitance.

Figure 6:
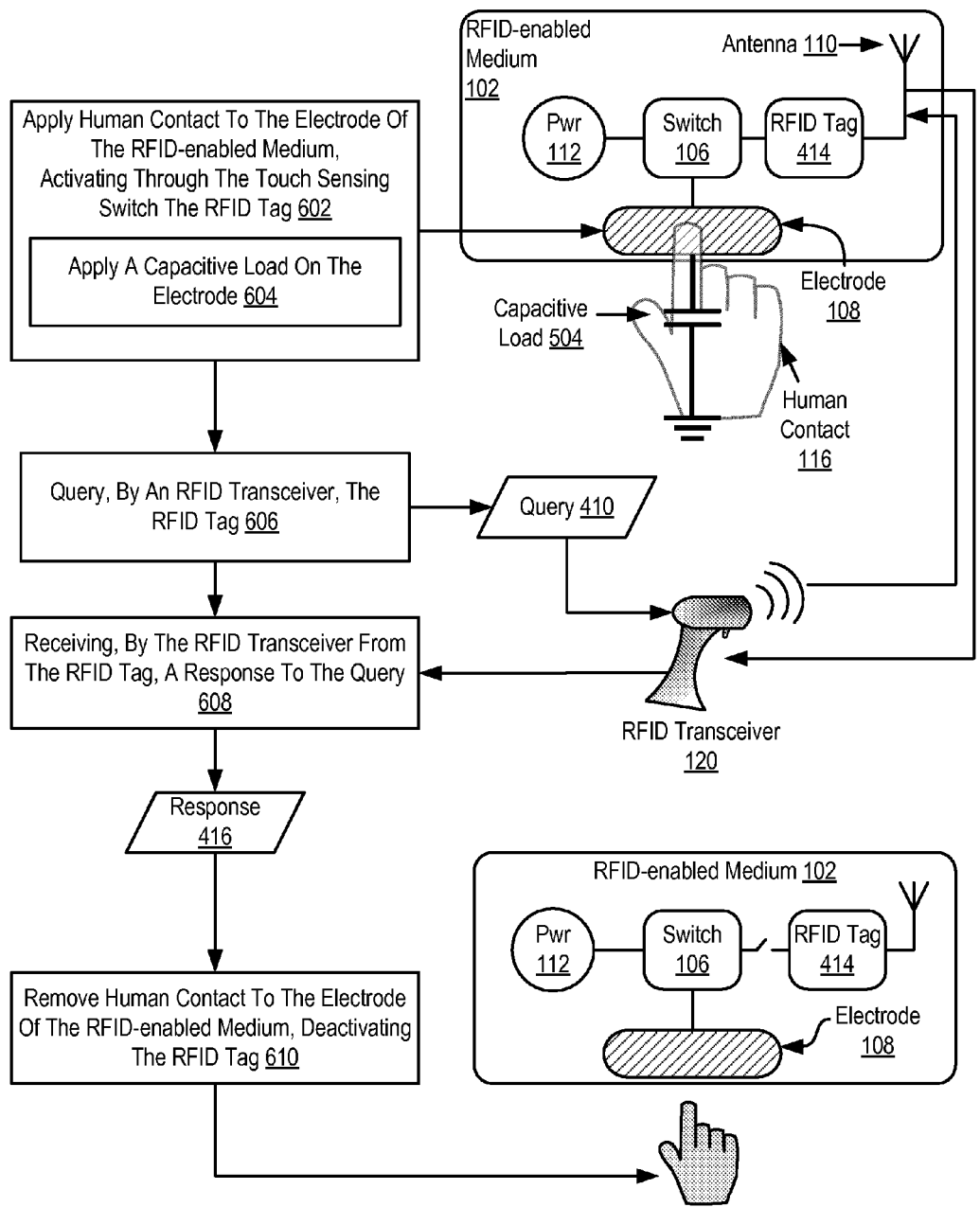
FIG. 6 sets forth a flow chart illustrating an exemplary method retrieving data from a secure, Radio Frequency Identification ('RFID')-enabled medium.

For further explanation, FIG. 6 sets forth a flow chart illustrating an exemplary method retrieving data from a secure, Radio Frequency Identification ('RFID')-enabled medium. The RFID-enabled medium (102) in the example of FIG. 6 includes an RFID tag (414) coupled to an antenna (110) and a touch sensing switch (106) where the touch sensing switch (106) is coupled to an electrode (108) and a power source (112) and adapts the RFID tag (414) to the power source (212). The method of FIG. 6 includes applying (602) human contact (116) to the electrode (108) of the RFID-enabled medium (102), activating through the touch sensing switch (106) the RFID tag (414). In the method of FIG. 6, applying (602) human contact (116) to the electrode (108) of the RFID-enabled medium (102) is carried out by applying (604) a capacitive load (504)—body capacitance—on the electrode (108). The method of FIG. 6 also includes querying (606), by an RFID transceiver (120), the RFID tag (414). Querying (606) the RFID tag (414) may include transmitting a query (410) encoded in an RF signal. The method of FIG. 6 also includes receiving (608), by the RFID transceiver (120) from the RFID tag (414), a response (416) to the query (410). Receiving (608), by the RFID transceiver (120) from the RFID tag (414), a response (416) to the query (410) may include receiving an RF signal encoding an unique, or semi-unique, identifier of the RFID tag useful as an index into one or more tables, records, or other data structures forming a database of information. The method of FIG. 6 also includes removing (610) human contact (116) to the electrode (108) of the RFID-enabled medium (102), deactivating the RFID tag (414). In the method of FIG. 6, the electrical pathway between the switch (106) and the RFID tag (414) of the RFID-enabled medium (102) is depicted as open for purposes of clarity only, not limitation. Readers of skill in the art will immediately recognize that RFID-enabled media configured for security according to embodiments of the present invention may provide, by the switch (106), operating power to the RFID tag by asserting a signal on the electrical pathway between the RFID tag (414) and switch (106). In such embodiments, the electrical pathway between the switch (106) and the RFID tag (414) may remain complete, with no signal asserted by the switch and carrying no operating power to the RFID tag (414), when no human contact is applied to the electrode (108).

In view of the explanations set forth above, readers will recognize that the benefits of security in an RFID-enabled medium according to embodiments of the present invention include:

- The default inactivity of the RFID tag in the secure, RFID-enabled medium configured according to embodiments of the present invention reduces the risk of data theft, malicious tracking of a person through RFID tags, and so on.
- Provides security without decreasing the rate of data transfer, in contrast to increased encryption of the data which requires greater processing capabilities and time to decrypt the data.
- Capacitance switches reduce the risk of accidental operation present in mechanical switches which may accidentally be operated during transport in a bag, purse, briefcase, pocket or the like.
- Capacitance touch switches have a greater mean-time-before-failure in comparison to mechanical switches.
- The default inactivity without human contact with the electrode enables an RFID-enabled medium secured according to embodiments of the present invention to be displayed, unshielded, without risk of RFID tag activation.
- The capacitance touch switch requires no mechanical compression point to activate the RFID tag.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of Radio Frequency Identification ('RFID') security in an RFID-enabled medium, the RFID-enabled medium comprising an RFID tag coupled to an antenna, and a touch sensing switch, the touch sensing switch coupled to two electrodes and a power source, the electrodes located on the outer edges of opposite sides of the RFID-enabled medium, the touch sensing switch adapting the RFID tag to the power source, the method comprising:
    sensing, by the touch sensing switch, human contact with the electrodes; and
    providing, by the touch sensing switch only during human contact with the electrodes, operating power from the power source to the RFID tag, including providing, only during human contact with both electrodes, operating power from the power source to the RFID tag.

2. The method of claim 1 further comprising:
    receiving, by the RFID tag through the antenna from an RFID transceiver, an RFID query; and
    responding to the RFID query by the RFID tag through the antenna.

3. The method of claim 1 wherein sensing, by the touch sensing switch, human contact with the electrodes further comprises receiving, by the electrodes, a capacitive load upon human contact with the electrodes.

4. The method of claim 1 wherein the RFID tag comprises a passive RFID tag and the power source comprises the antenna when electrical current is induced in the antenna upon receiving a transmitted Radio Frequency ('RF') signal from an RFID transceiver.

5. The method of claim 1 wherein the RFID tag comprises an active RFID tag and the power supply comprises a battery.

6. The method of claim 1 wherein the RFID-enabled medium further comprises an identification card.

7. The method of claim 1 wherein the RFID-enabled medium further comprises a card issued to a user by a financial institution.

8. The method of claim 1 wherein the RFID-enabled medium further comprises a government issued passport.

9. A secure, Radio Frequency Identification ('RFID')-enabled medium, the RFID-enabled medium comprising an RFID tag coupled to an antenna and a touch sensing switch, the touch sensing switch coupled to two electrodes and a power source, the electrodes located on the outer edges of opposite sides of the RFID-enabled medium, the touch sensing switch adapting the RFID tag to the power source,
    the touch sensing switch configured to sense human contact with the electrodes and provide, only during human contact with the electrodes, operating power from the power source to the RFID tag, including providing, only during human contact with both electrodes, operating power from the power source to the RFID tag.

10. The RFID-enabled medium of claim 9 wherein the touch sensing switch configured to sense human contact with the electrodes further comprises the touch sensing switch configured to receive, by the electrodes, a capacitive load upon human contact with the electrodes.

11. The RFID-enabled medium of claim 9 wherein the RFID tag comprises a passive RFID tag and the power source comprises the antenna when electrical current is induced in the antenna upon receiving a transmitted Radio Frequency ('RF') signal from an RFID transceiver.

12. The RFID-enabled medium of claim 9 wherein the RFID tag comprises an active RFID tag and the power supply comprises a battery.

13. The RFID-enabled medium of claim 9 further comprising an identification card.

14. The RFID-enabled card of claim 9 further comprising a card issued to a user by a financial institution.

15. A method of retrieving data from a secure, Radio Frequency Identification ('RFID')-enabled medium, the RFID-enabled medium comprising an RFID tag coupled to an antenna and a touch sensing switch, the touch sensing switch coupled to two electrodes an electrode and a power source, the electrodes located on the outer edges of opposite sides of the RFID-enabled medium, the touch sensing switch adapting the RFID tag to the power source, the method comprising:
    applying human contact to the electrodes of the RFID-enabled medium, activating through the touch sensing switch the RFID tag;
    querying, by an RFID transceiver, the RFID tag;
    receiving, by the RFID transceiver from the RFID tag, a response to the query; and
    removing human contact to the electrodes of the RFID-enabled medium, deactivating the RFID tag.

16. The method of claim 15 wherein applying human contact to the electrode of the RFID-enabled medium further comprises applying a capacitive load on the electrodes.

17. The method of claim 15 wherein the RFID tag comprises a passive RFID tag and the power source comprises the antenna when electrical current is induced in the antenna upon receiving a transmitted Radio Frequency ('RF') signal from an RFID transceiver.

18. The method of claim 15 wherein the RFID tag comprises an active RFID tag and the power supply comprises a battery.

* * * * *